(12) United States Patent
Murase (10) Patent No.: US 12,377,681 B2
(45) Date of Patent: Aug. 5, 2025

(54) PNEUMATIC TIRE

(71) Applicant: THE YOKOHAMA RUBBER CO., LTD, Tokyo (JP)

(72) Inventor: Keisuke Murase, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 571 days.

(21) Appl. No.: 16/632,678

(22) PCT Filed: Jul. 19, 2018

(86) PCT No.: PCT/JP2018/027170
§ 371 (c)(1),
(2) Date: Jan. 21, 2020

(87) PCT Pub. No.: WO2019/017449
PCT Pub. Date: Jan. 24, 2019

(65) Prior Publication Data
US 2020/0223258 A1 Jul. 16, 2020

(30) Foreign Application Priority Data
Jul. 21, 2017 (JP) ................................. 2017-142122

(51) Int. Cl.
| | | |
|---|---|---|
| *B60C 1/00* | (2006.01) | |
| *B60C 11/03* | (2006.01) | |
| *C08K 3/36* | (2006.01) | |
| *C08K 5/098* | (2006.01) | |
| *C08L 15/00* | (2006.01) | |

(52) U.S. Cl.
CPC ........ *B60C 1/0016* (2013.01); *B60C 11/0304* (2013.01); *C08K 3/36* (2013.01); *C08K 5/098* (2013.01); *C08L 15/00* (2013.01); *B60C 2011/0348* (2013.01); *C08K 2201/006* (2013.01)

(58) Field of Classification Search
CPC ........ B60C 11/03; B60C 1/00; B60C 1/0016; B60C 11/0304; B60C 2011/0348; C08K 3/36; C08K 5/098; C08K 5/10; C08K 5/5419; C08K 5/548; C08K 3/04; C08K 3/22; C08K 5/09; C08K 5/18; C08K 5/103; C08K 3/06; C08K 5/31; C08K 5/47; C08K 2201/006; C08L 15/00; C08L 9/00; C08L 91/00; C08L 45/00; Y02T 10/86

See application file for complete search history.

(56) References Cited

U.S. PATENT DOCUMENTS

| | | | |
|---|---|---|---|
| 2017/0158842 A1* | 6/2017 | Tsukishima | C08K 5/548 |
| 2017/0233559 A1* | 8/2017 | Tsukishima | C08L 45/00 |
| | | | 524/262 |
| 2018/0215206 A1* | 8/2018 | Kuriyama | B60C 11/04 |

FOREIGN PATENT DOCUMENTS

| | | | | |
|---|---|---|---|---|
| JP | 2005-206673 A | | 8/2005 | |
| JP | 2016-37601 A | | 3/2016 | |
| JP | 2016-113602 A | | 6/2016 | |
| JP | 2016-169359 A | | 9/2016 | |
| JP | 2016-183265 A | | 10/2016 | |
| WO | WO-2012073841 A1 * | | 6/2012 | ........ B60C 1/0016 |
| WO | WO-2016010143 A1 * | | 1/2016 | ........ B60C 1/0016 |
| WO | WO-2016021394 A1 * | | 2/2016 | ............ B60C 1/00 |
| WO | 2017/018174 A1 | | 2/2017 | |

OTHER PUBLICATIONS

English machine translation of JP 2005-206673 (Year: 2005).*
English machine translation of WO 2012/073841. (Year: 2012).*
International Search Report issued Oct. 16, 2018 in corresponding International Patent Application No. PCT/JP2018/027170, filed Jul. 19, 2018 (with English Translation).

* cited by examiner

*Primary Examiner* — Angela C Scott
(74) *Attorney, Agent, or Firm* — Global IP Counselors, LLP (57) ABSTRACT

A pneumatic tire includes a tread portion composed of a tread rubber composition containing silica. The pneumatic tire exhibits improved processability over time without negatively affecting the wet grip properties and rolling resistance of the tread rubber composition. The tread portion includes a tread rubber composition including: 50 parts by mass to 90 parts by mass of silica, per 100 parts by mass of diene rubber containing 30 mass % to 90 mass % of a terminal-modified diene rubber; an alkylsilane; a fatty acid metal salt a containing an alkali metal element; and a fatty acid ester; and by further compounding, at an amount of 5 mass % to 12 mass % with respect to the silica amount, a sulfur-containing silane coupling agent not containing a mercapto group.

7 Claims, 4 Drawing Sheets

PNEUMATIC TIRE

CROSS-REFERENCE TO RELATED APPLICATION

This application is a U.S. National Stage application of International Application No. PCT/JP2018/027170, filed Jul. 19, 2018, which claims priority to Japanese Patent Application No. 2017-142122, filed Jul. 21, 2017, the contents of each of which are hereby incorporated herein by reference.

BACKGROUND

Field of the Invention

The present invention relates to a pneumatic tire having a tread portion composed of a tread rubber composition containing silica.

Background Information

Conventional examples of the required performance of a pneumatic tire include excellent wet grip properties and low heat build-up (low rolling resistance). An example of a method for providing this type of performance in a compatible manner is a method of compounding a large amount of silica in a tread rubber composition that constitutes a tread portion of a pneumatic tire. However, because silica has poor dispersibility in diene rubber, it is difficult to sufficiently obtain an improvement effect through silica simply by compounding silica, and for example, as a dispersant for silica, compounding a silane coupling agent containing a mercapto group has been proposed (for example, see JP 2016-183265 A).

SUMMARY

It has been found that although the reaction efficiency of the silane coupling agent containing a mercapto group with the diene rubber is high, the scorch time of a rubber composition in which this silane coupling agent has been compounded can be too short, and processability such as extrudability is negatively affected, which is a problem. When processability is negatively affected in this way, it is difficult to use this rubber composition and form a tread portion having a complex pattern in which a plurality of grooves are formed to increase wet performance, for example. Thus, with respect to a tread rubber composition in which a large amount of silica is compounded, there is a demand for further measures to improve processability over time without negatively affecting wet grip properties and rolling resistance.

Therefore, an object of the present invention is to provide a pneumatic tire having a tread portion composed of a tread rubber composition containing silica, the processability over time being improved without negatively affecting the wet grip properties and rolling resistance of the tread rubber composition.

A pneumatic tire of an embodiment of the present invention that achieves this object has a tread portion composed of a tread rubber composition, the tread portion extending in a tire circumferential direction and being an annular shape, the tread rubber composition being a compound including: 50 parts by mass to 90 parts by mass of silica, per 100 parts by mass of diene rubber containing 30 mass % to 90 mass % of terminal-modified diene rubber; an alkylsilane; a fatty acid metal salt a containing an alkali metal element; and a fatty acid ester and by further compounding, at an amount 5 mass % to 12 mass % with respect to the silica amount, a sulfur-containing silane coupling agent not containing a mercapto group.

The pneumatic tire according to an embodiment of the present invention includes a tread portion that is a tread rubber composition formed of the composition described above and provides both excellent wet grip properties and low rolling resistance in a compatible manner. Furthermore, the tread rubber composition formed of the composition described above excels in processability over time and thus can be suitably used in a tread portion of a pneumatic tire.

In an embodiment of the present invention, in addition to the fatty acid metal salt a containing an alkali metal element, a fatty acid metal salt b, different from the fatty acid metal salt a, is preferably compounded. This is advantageous for achieving excellent wet grip properties and low rolling resistance of the tread rubber composition in a compatible manner and for improving processability over time.

In an embodiment of the present invention, the CTAB adsorption specific surface area of the silica is preferably from 180 $m^2/g$ to 250 $m^2/g$. Setting the CTAB adsorption specific surface area of the silica to such a range is advantageous for providing both excellent wet grip properties and low rolling resistance for the tread rubber composition in a compatible manner.

In an embodiment of the present invention, at least three main grooves extending in the tire circumferential direction and disposed at intervals outward in a tire lateral direction from a tire center region are disposed in the tread portion. The tread portion includes a center land portion defined by the main grooves and located on a tire equator, a shoulder land portion disposed on the outermost side in the tire lateral direction, and an intermediate land portion disposed between the center land portion and the shoulder land portion and defined by the main grooves. The center land portion includes a circumferential narrow groove 41 extending in the tire circumferential direction and has a groove width that is smaller than that of the main grooves. A center lug groove extends in the tire lateral direction with an end portion on the intermediate land portion side communicating with the main groove and with the other end portion communicating with the circumferential narrow groove. The intermediate land portion includes an intermediate lug groove extending in the tire lateral direction with both ends communicating with the main grooves. The shoulder land portion includes a shoulder lug groove extending in the tire lateral direction with an end portion on the intermediate land portion side communicating with the main groove and with the other end portion opening to a ground contact edge. The center lug groove, the intermediate lug groove, and the shoulder lug groove form a series of communication lug grooves extending continuously from the ground contact edge toward the tire equator side. With such a tread portion, efficient drainage from the tire center region to the ground contact edge can be achieved by the communication lug grooves, and wet performance can be effectively improved through combined action with the excellent wet grip properties of the tread rubber composition. Furthermore, because the tread rubber composition excels in processability, even a tread portion with such a complex shape can be easily formed.

In embodiments of the present invention, "ground contact edge" refers to both end portions in the tire axial direction of a surface (ground contact surface) actually contacting a flat surface on which a tire is placed when the tire is mounted onto a regular rim, inflated to a regular internal pressure, and placed vertically on the flat surface with a regular load applied thereto. "Regular rim" is a rim defined by a standard for each tire according to a system of standards that includes the standard on which each tire is based and refers to a "standard rim" in the case of JATMA, refers to a "design rim" in the case of TRA, or refers to a "measuring rim" in the case of ETRTO. "Regular internal pressure" is an air pressure defined by a standard for each tire according to a system of standards that includes the standard on which each tire is based and refers to a "maximum air pressure" in the case of JATMA, refers to the maximum value in the table of "TIRE ROAD LIMITS AT VARIOUS COLD INFLATION PRESSURES" in the case of TRA, or refers to the "INFLATION PRESSURE" in the case of ETRTO. The regular internal pressure is 180 kPa for a tire on a passenger vehicle. "Regular load" is a load defined by a standard for each tire according to a system of standards that includes the standard on which each tire is based and refers to a "maximum load capacity" in the case of JATMA, refers to the maximum value in the table of "TIRE ROAD LIMITS AT VARIOUS COLD INFLATION PRESSURES" in the case of TRA, or refers to "LOAD CAPACITY" in the case of ETRTO. If the tire is for use with a passenger vehicle, a load corresponding to 88% of the loads described above is used.

BRIEF DESCRIPTION OF THE DRAWINGS

The invention will be explained in more detail hereinafter with reference to the drawings.

DETAILED DESCRIPTION OF THE EMBODIMENTS

Configurations of embodiments of the present invention are described in detail below with reference to the accompanying drawings.

Figure 1:
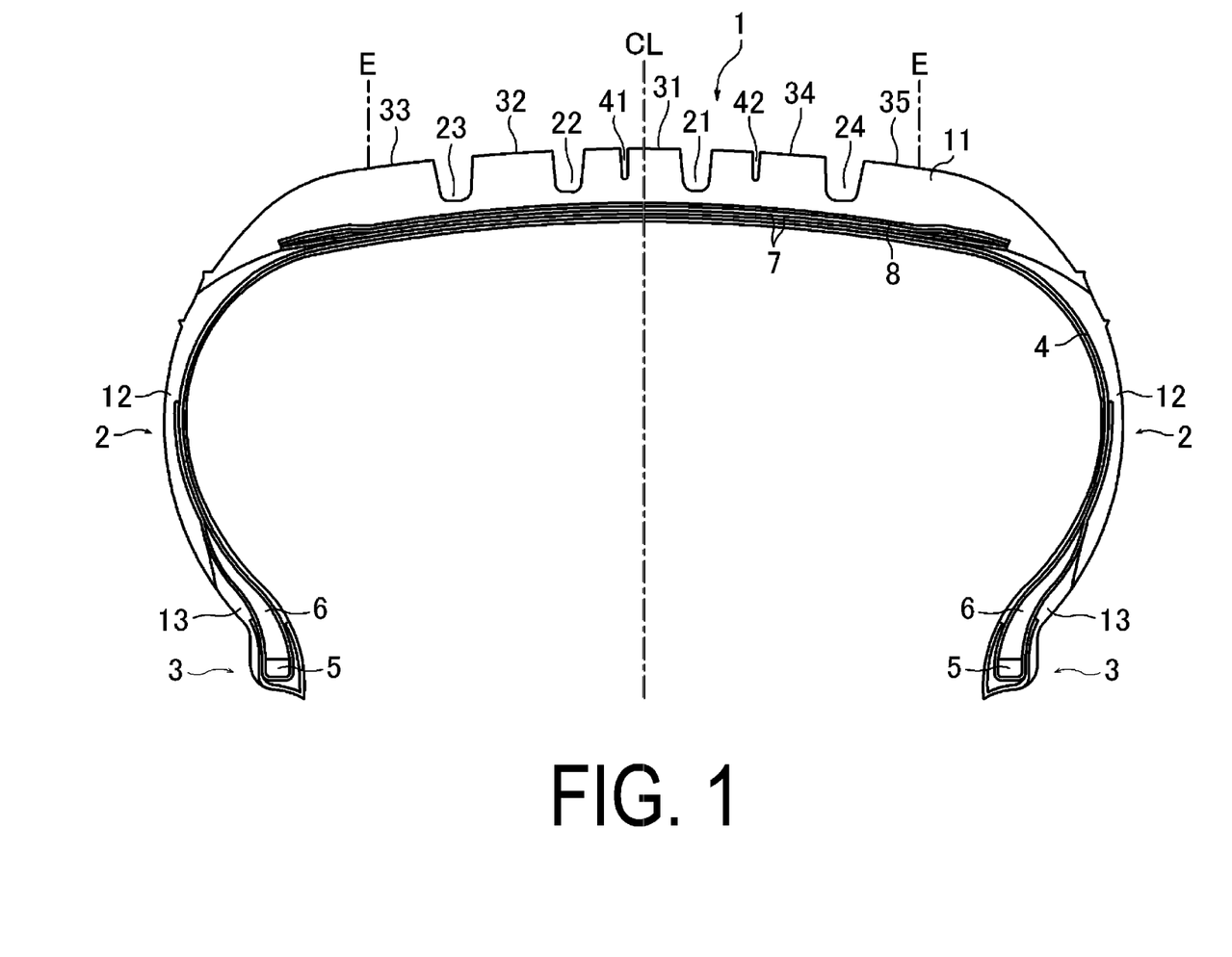
FIG. 1 is a meridian cross-sectional view of a pneumatic tire according to an embodiment of the present invention.

As illustrated in FIG. 1, the pneumatic tire of an embodiment of the present invention includes a tread portion 1 having an annular shape and extending in the tire circumferential direction, a pair of sidewall portions 2 disposed on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is disposed on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

A tread rubber layer 11 is disposed on the outer circumferential side of the carcass layer 4 in the tread portion 1. A side rubber layer 12 is disposed on the outer circumferential side (outward in the tire lateral direction) of the carcass layer 4 of each of the sidewall portions 2, and a rim cushion rubber layer 13 is disposed on the outer circumferential side (outward in the tire lateral direction) of the carcass layer 4 in each of the bead portions 3. The tread rubber layer 11 can have a structure in which two types of rubber layers (cap tread rubber layer and undertread rubber layer) with different physical properties are layered in the tire radial direction.

The present invention can be applied to such a general pneumatic tire; however, the cross-sectional structure thereof is not limited to the basic structure described above.

In the rubber composition constituting the tread rubber layer 11 of the pneumatic tire according to an embodiment of the present invention (hereinafter referred to as a "tread rubber composition"), the rubber component is diene rubber and is required to include terminal-modified diene rubber. As the terminal-modified diene rubber, for example, terminal-modified solution-polymerized styrene-butadiene rubber (hereinafter, referred to as "modified S-SBR") can be used. The modified S-SBR is solution-polymerized styrene-butadiene rubber in which one or both terminals of a main chain of the styrene-butadiene rubber are modified by a functional group that is reactive with a silanol group on a surface of the silica. The functional group that reacts with a silanol group is preferably at least one type selected from a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group. Among these, the hydroxyl group-containing polyorganosiloxane structure, the hydroxyl group, and the amino group are more preferable.

In the tread rubber composition of an embodiment of the present invention, in 100 mass % of the diene rubber, the content of the terminal-modified diene rubber (for example, the modified S-SBR) is from 30 mass % to 90 mass % and preferably from 40 mass % to 85 mass %. When the content of the terminal-modified diene rubber is less than 30 mass %, wear resistance deteriorates, and the rolling resistance cannot be reduced. When the content of the terminal-modified diene rubber is greater than 90 mass %, the wear resistance deteriorates.

In an embodimnet in which the terminal-modified diene rubber is modified S-SBR, the styrene unit content of the modified S-SBR is preferably 35 mass % or greater and more preferably from 35 mass % to 40 mass %. When the styrene unit content of the modified S-SBR is less than 35 mass %, the rigidity and strength of the rubber composition are insufficient, and the wear resistance and the wet grip properties cannot be sufficiently enhanced. Note that the styrene unit content of the modified S-SBR is measured by infrared spectroscopy (Hampton method).

The tread rubber composition of an embodiment of the present invention can optionally contain other diene rubber besides the terminal-modified diene rubber (for example, modified S-SBR) described above. Examples of other diene rubber includes natural rubber, isoprene rubber, butadiene rubber, unmodified solution-polymerized or emulsion-polymerized styrene-butadiene rubber, and other such rubber normally used in a tire rubber composition. Among these, butadiene rubber and unmodified solution-polymerized styrene-butadiene rubber are preferable. The diene rubber can be used alone or as a discretionary blend thereof.

Note that in an embodiment in which the tread rubber layer 11 has a layered structure with a cap tread rubber layer and an undertread rubber layer as described above, the tread rubber composition according to the embodiment of the present invention described above is used in at least the cap tread rubber layer.

The tread rubber composition of this embodiment of the present invention is always compounded with silica as a filler. By compounding silica, the strength of the rubber composition can be increased. Moreover, rolling resistance can be reduced while increasing wet grip properties. The compounded amount of the silica is from 50 parts by mass to 90 parts by mass and preferably from 60 to 80 parts by mass, relative to 100 parts by mass of the diene rubber. If the compounded amount of the filler is less than 50 parts by mass, the wet grip properties decrease. If the compounded amount of silica exceeds 90 parts by mass, the rolling resistance is negatively affected.

The silica used in this embodiment of the present invention has a CTAB adsorption specific surface area of preferably from 180 $m^2/g$ to 250 $m^2/g$ and more preferably from 190 $m^2/g$ to 240 $m^2/g$. If the CTAB adsorption specific surface area of the silica is less than 180 $m^2/g$, the wet grip properties decrease. If the CTAB adsorption specific surface area of the silica exceeds 250 $m^2/g$, the rolling resistance is negatively affected. Note that in this embodiment of the present invention, the CTAB specific surface area of the silica is measured in accordance with ISO 5794.

The rubber composition according to one embodiment of the present invention can contain an inorganic filler besides the silica. Examples of other inorganic fillers include carbon black, clay, talc, calcium carbonate, mica, and aluminum hydroxide.

The tread rubber composition of this embodiment of the present invention is always compounded with a silane coupling agent. By compounding a silane coupling agent, aggregation of the silica and an increase in the viscosity of the rubber composition can be suppressed, and more excellent rolling resistance and wet performance can be achieved. The silane coupling agent used in the present invention contains sulfur but does not contain a mercapto group. Examples of this type of silane coupling agent include bis-(3-triethoxysilylpropyl)tetrasulfide, bis-(3-triethoxysilylpropyl)disulfide, 3-trimethoxysilylpropyl benzothiazole tetrasulfide, and 3-octanoylthiopropyl triethoxysilane. The compounded amount of the silane coupling agent is from 5 mass % to 12 mass % and preferably from 6 mass % to 10 mass %, based on a mass of the silica. When the compounded amount of the silane coupling agent is less than 5 mass %, the wet grip properties decrease. In an embodiment in which the compounded amount of the silane coupling agent exceeds 12 mass %, processability is negatively affected.

The tread rubber composition according to one embodiment of the present invention must contain an alkylsilane as a plasticizer component. By compounding an alkylsilane, aggregation of the silica and an increase in the viscosity of the rubber composition can be suppressed, and more excellent rolling resistance and wet performance can be achieved. The alkylsilane is preferably an alkyltriethoxysilane having an alkyl group with from 7 to 20 carbons. Examples of the alkyl group having from 7 to 20 carbons include a heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among these, from the perspective of miscibility with the diene rubber, an alkyl group having from 8 to 10 carbons is preferable, and an octyl group or nonyl group is even more preferable. The compounded amount of the alkylsilane is preferably from 0.5 mass % to 10 mass % and more preferably from 1 mass % to 6 mass %, with respect to the mass of the silica. If the compounded amount of the alkylsilane is less than 0.5 mass %, rolling resistance is negatively affected. Additionally, if the compounded amount of the alkylsilane exceeds 10 mass %, wet grip properties decrease.

The tread rubber composition according to an embodiment of the present invention must contain a fatty acid ester as a plasticizer component. By compounding a fatty acid ester, aggregation of the silica and an increase in the viscosity of the rubber composition can be suppressed, and more excellent rolling resistance and wet performance can be achieved. Examples of the fatty acid ester include various fatty acids and $C_1$ to $C_5$ lower alcohol esters; and also sorbitan esters, glycerin esters, and other polyhydric alcohol esters. Examples of various fatty acids include caprylic acid, undecylenic acid, lauryl acid, myristic acid, palmitic acid, margaric acid, stearic acid, arachidic acid, lignoceric acid, cerotic acid, mellitic acid, myristoleic acid, oleic acid, linoleic acid, and linolenic acid. The compounded amount of the fatty acid ester is preferably from 0.3 mass % to 6 mass % and more preferably from 0.5 mass % to 4 mass %, relative to the mass of the silica. If the compounded amount of the fatty acid ester is less than 0.3 mass %, rolling resistance is negatively affected. Additionally, if the compounded amount of the fatty acid ester exceeds 6 mass %, wet grip properties decrease.

The tread rubber composition of an embodiment of the present invention must contain a fatty acid metal salt a containing an alkali metal element as a plasticizer component. By compounding the fatty acid metal salt a, aggregation of the silica and an increase in the viscosity of the rubber composition can be suppressed, and more excellent rolling resistance and wet performance can be achieved. Examples of the fatty acid metal salt a include salts of the various fatty acids described above; and salts of the alkali metals such as lithium, sodium, and potassium. The fatty acid metal salt a can be used alone, or two or more types of these fatty acid metal salts a can be compounded in combination. The compounded amount of the fatty acid metal salt a is preferably from 0.3 mass % to 6 mass % and more preferably from 0.5 mass % to 4 mass %, relative to the mass of the silica. If the compounded amount of the fatty acid metal salt a is less than 0.3 mass %, rolling resistance is negatively affected. Additionally, if the compounded amount of the fatty acid metal salt a exceeds 6 mass %, wet grip properties decrease.

The tread rubber composition of an embodiment of the present invention can further contain a fatty acid metal salt b that is different from the fatty acid metal salt a as a plasticizer component. By compounding the fatty acid metal salt b, aggregation of the silica and an increase in the viscosity of the rubber composition can be suppressed, and the effect of enabling more excellent rolling resistance and wet performance can be increased. Examples of the fatty acid metal salt b include salts of the various fatty acids described above and salts of the metals such as calcium, magnesium, and zinc. The fatty acid metal salt b can be used alone, or two or more types of these fatty acid metal salts a can be compounded in combination. The compounded amount of the fatty acid metal salt b is preferably from 0.3 mass % to 6 mass % and more preferably from 0.5 mass % to 4 mass %, relative to the mass of the silica. If the compounded amount of the fatty acid metal salt b is less than 0.3 mass %, rolling resistance is negatively affected. Additionally, if the compounded amount of the fatty acid metal salt b exceeds 6 mass %, wet grip properties decline.

Other compounding agents besides those described above can be added to the tread rubber composition of an embodiment of the present invention. Examples of other compounding agents include various compounding agents that are commonly used in rubber compositions for a pneumatic tire, such as vulcanization or crosslinking agents, vulcanization accelerators, anti-aging agents, liquid polymers, thermosetting resins, and thermoplastic resins. These compounding agents can be compounded in typical amounts conventionally used so long as the objects of the present invention are not hindered. Moreover, as a kneader, an ordinary kneading machine for rubber can be used, such as a Banbury mixer, a kneader, and a roller.

Due to the compounding and physical properties described above, the tread rubber composition of this embodiment of the present invention can improve processability over time while achieving excellent wet grip properties and low rolling resistance in a compatible manner. Thus, a pneumatic tire that uses the tread rubber composition can exhibit excellent wet grip properties and low rolling resistance. Furthermore, because the processability of the tread rubber composition is excellent, the tread portion 1 can be easily formed even when the tread portion 1 has a complex groove shape for the purpose of improving drainage properties and the like.

Figure 2:
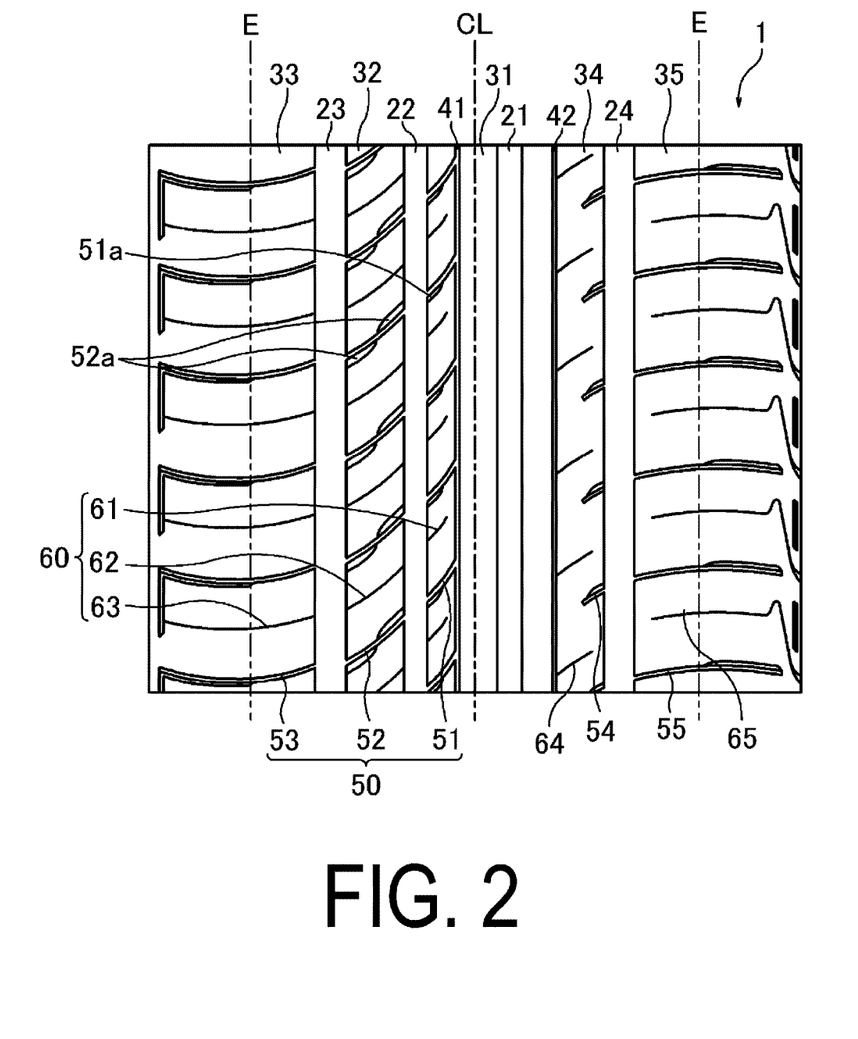
FIG. 2 is a front view illustrating a tread portion of a pneumatic tire according to an embodiment of the present invention.

In an embodiment in which the tread portion 1 is composed of the tread rubber composition described above, the pneumatic tire according to this embodiment of the present invention can exhibit excellent performance as described above still preferably has a tread pattern illustrated in FIG. 2.

In the example illustrated in FIG. 2, at least three main grooves 21, 22, 23 extending in the tire circumferential direction and disposed at intervals outward in the tire lateral direction from the tire center region are formed in the tread portion 1. Furthermore, a center land portion 31 is defined by the main grooves 21, 22, a shoulder land portion 33 is defined outward in the tire lateral direction of the main groove 23, and an intermediate land portion 32 is defined by the main grooves 22, 23. The center land portion 31 is located on the tire equator CL, the shoulder land portion 33 is located on the outermost side in the tire lateral direction, and the intermediate land portion 32 is located between the center land portion 31 and the shoulder land portion 33.

A circumferential narrow groove 41 extending in the tire circumferential direction and having a groove width that is smaller than that of any of the main grooves 21, 22, 23 is formed in the center land portion 31. Center lug grooves 51 extending in the tire lateral direction are formed in the center land portion 31. An end portion of each center lug groove 51 on the intermediate land portion 32 side communicates with the main groove 22, and the other end portion communicates with the circumferential narrow groove 41. Intermediate lug grooves 52 extending in the tire lateral direction are formed in the intermediate land portion 32. The two ends of each intermediate lug groove 52 communicate with the main grooves 22, 23, respectively. Shoulder lug grooves 53 extending in the tire lateral direction are formed in the shoulder land portion 33. An end portion of each shoulder lug groove 53 at the intermediate land portion 32 side communicates with the main groove 23, and the other end portion is open to a ground contact edge E. Note that the center lug grooves 51 and the intermediate lug grooves 52 are chamfered, and chamfered portions 51a, 52a are respectively formed.

Figure 3:
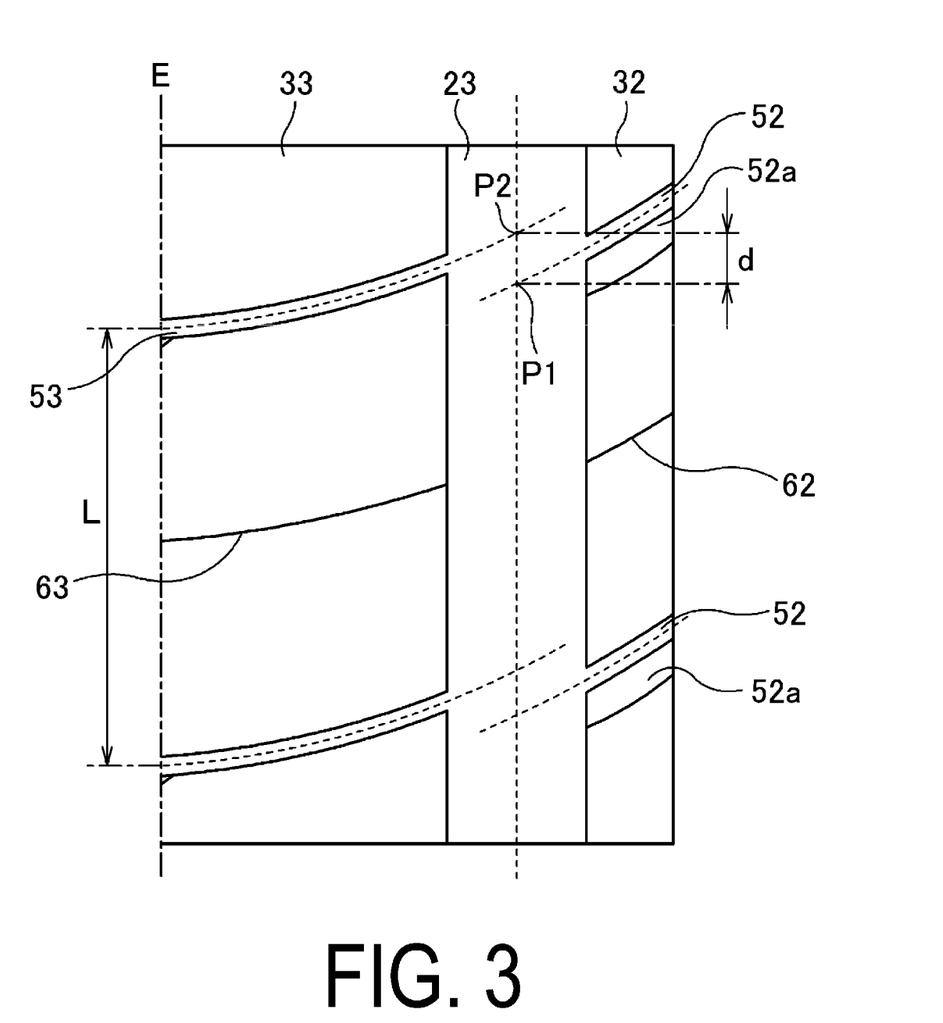
FIG. 3 is an explanatory diagram illustrating main portions of FIG. 2 in an enlarged manner.

The center lug grooves 51, the intermediate lug grooves 52, and the shoulder lug grooves 53 constitute a series of communication lug grooves 50 extending continuously from the ground contact edge E toward the tire equator CL. Note that, in an embodiment of the present invention, as illustrated in FIG. 3, with regard to a pair of lug grooves (intermediate lug groove 52 and shoulder lug groove 53 in FIG. 3) that communicate with one main groove (main groove 23 is exemplified in FIG. 3), in a case where a distance d in the tire circumferential direction between an intersection point P1 and an intersection point P2 satisfies a relationship of $0 \leq d/L \leq 0.20$ with respect to a pitch length L of the communication lug groove 50 (shoulder lug groove 53), the intersection point P1 being between a groove center line of a lug groove (intermediate lug groove 52) on one side and a groove center line of the main groove 23, the intersection point P2 being between a groove center line of a lug groove (shoulder lug groove 53) on the other side and the groove center line of the main groove 23, these lug grooves (intermediate lug groove 52 and shoulder lug groove 53) are considered to be continuously extending. An embodiment based on the main groove 23, the intermediate lug grooves 52, and the shoulder lug grooves 53 in FIG. 3 has been described, but the same applies to embodiments including the main groove 22, the center lug grooves 51, and the intermediate lug grooves 52.

By configuring the tread portion 1 in this manner, efficient drainage from the tire center region to the ground contact edge E can be achieved through particularly the communication lug grooves 50, and wet performance of the pneumatic tire can be effectively improved through combined action with the excellent wet grip properties of the tread rubber composition. Additionally, the tread portion 1 has a complex groove shape, but as described above, the tread rubber composition excels in processability and can thus be easily formed.

In one embodiment of the present invention, as illustrated in FIG. 2, communicating sipes 60 extending along the communication lug grooves 50 can be disposed between communication lug grooves 50 adjacent in the tire circumferential direction. Each communicating sipe 60 is composed of: a center sipe 61 extending along the center lug grooves 51 and located between center lug grooves 51 adjacent in the tire circumferential direction; an intermediate sipe 62 extending along the intermediate lug grooves 52 and located between intermediate lug grooves 52 adjacent in the tire circumferential direction; and a shoulder sipe 63 extending along the shoulder lug grooves 53 and located between shoulder lug grooves 53 adjacent in the tire circumferential direction. In the illustrated embodiment, an end portion of the center sipe 61 on the intermediate land portion 32 side communicates with the main groove 22, and the other end portion terminates within the center land portion 31 without communicating with the circumferential narrow groove 41; the two end portions of the intermediate sipe 62 communicate with the main grooves 22, 23, respectively; and an end portion of the shoulder sipe 63 on the intermediate land portion 32 side communicates with the main groove 23, and the other end portion is open to the ground contact edge E. By providing such a communicating sipe 60, the drainage properties from the tire center region to the ground contact edge E can be further improved.

In the case of a pneumatic tire with a designated mounting direction with respect to a vehicle, when a side designated to be on an inner side with respect to the vehicle when the tire is mounted on the vehicle is designated as the "vehicle inner side", and a side designated to be on an outer side with respect to the vehicle when the tire is mounted on the vehicle is designated as the "vehicle outer side", it is preferable that at least three main grooves 21, 22, 23 are formed from the tire center region toward the vehicle inner side, the shoulder land portion 33 is disposed on the outermost side in the tire lateral direction on the vehicle inner side, and the communication lug grooves 50 are disposed on the vehicle inner side. The communication lug grooves 50 excel in drainage properties as described above, but because the communication lug grooves 50 communicate from the tire center region to the ground contact edge E, noise such as pattern noise tends to be easily transmitted. However, by disposing the communication lug grooves 50 on the vehicle inner side as described above, noise such as pattern noise is prevented from being radiated to the vehicle outer side through the communication lug grooves 50, and thus noise performance can be improved.

In embodiments of the present invention, the structure of grooves and land portions other than those described above is not particularly limited. For example, in the aspect illustrated in FIG. 2, a main groove 24 is provided in addition to the main grooves 21, 22, 23. The main groove 24 is disposed at a side opposite that of the main grooves 22, 23 with respect to the main groove 21 (in a case where the main grooves 22, 23 are formed on the vehicle inner side, then the main groove 24 is disposed on the vehicle outer side, which is the opposite side). A land portion 34 is defined by main grooves 21, 24, and a land portion 35 is defined outward in the tire lateral direction of the main groove 24. Additionally, a circumferential narrow groove 42, sipes 64, and lug grooves 54 can be disposed in the land portion 34. The circumferential narrow groove 42 extends in the tire circumferential direction and has a groove width that is smaller than that of each of the main grooves 21, 22, 23, 24. The sipes 64 each has an end communicating with the circumferential narrow groove 42 and the other end terminating within the land portion 34. The lug grooves 54 each has an end communicating with the main groove 24 and the other end terminating within the land portion 34. The land portion 35 includes lug grooves 55 each having an end communicating with the main groove 24 and the other end opening to the ground contact edge E, and sipes 65 extending in the tire lateral direction between lug grooves 35 adjacent in the tire circumferential direction. The sipes 65 have an end terminating within the land portion 35 and the other end opening to the ground contact edge E.

The present invention is further explained below by examples. However, the scope of the present invention is not limited to these examples.

EXAMPLES

For each of the rubber compositions for sixteen types of rubber compositions compounded as shown in Table 1 (Standard Example 1, Comparative Examples 1 to 8, and Examples 1 to 7), components to be compounded other than the sulfur and vulcanization accelerators were weighed and measured the components were kneaded in a 1.7 L sealed Banbury mixer for 5 minutes, and then a master batch was discharged at a temperature of 145° C. and cooled at room temperature. Next, the master batch was inserted into the 1.7 L sealed Banbury mixer, and the sulfur and vulcanization accelerator were added and mixed therewith for three minutes to prepare each of the rubber compositions. Note that because SBR1 and SBR2 include oil components, the content of the rubber components excluding the oil components is described in the lower parenthesis. Next, each rubber composition thus obtained was press vulcanized in a predetermined mold at 160° C. for 20 minutes to fabricate a vulcanized rubber test piece.

The processability, wet grip properties, and rolling resistance of each of the obtained rubber compositions were evaluated according to the methods described below.

Processability

The Mooney viscosity of each of the obtained rubber compositions was measured with a Mooney viscometer in accordance with JIS K6300 using an L-type rotor (diameter: 38.1 mm, thickness: 5.5 mm) with a preheating time of 1 minute, a rotor rotation time of 4 minutes, a temperature of 100° C., and a rotational speed of 2 rpm. Note that the Mooney viscosity was measured immediately after mixing and also after being treated for 168 hours in a humid hot oven (temperature: 30° C., humidity 80%). The difference between the Mooney viscosity immediately after mixing and the Mooney viscosity after the humid hot treatment was calculated and used as an indicator of processability over time. The obtained results are shown in the "Processability" section of Table 1 and are expressed as index values with Standard Example 1 being assigned the value of 100. Smaller values of this index value indicate a smaller change in viscosity over time and better processability over time.

Wet Grip Properties

Using a viscoelasticity spectrometer, available from Toyo Seiki Seisaku-sho, Ltd., the loss tangent tanδ at a temperature of 0° C. of each obtained test piece was measured in accordance with JIS K6394 at an initial strain of 10%, an amplitude of ±2%, and a frequency of 20 Hz. The obtained results are shown in the "Wet grip properties" section of Table 1 and are expressed as index values with Standard Example 1 being assigned the value of 100. Higher values of this index value indicate a larger tan δ at 0° C., and more excellent wet grip properties of a formed tire.

Rolling Resistance

Using a viscoelastic spectrometer, available from Toyo Seiki Seisaku-sho, Ltd., the loss tangent tan δ at a temperature of 60° C. of each obtained test piece was measured in accordance with JIS K6394 at an initial strain of 10%, an amplitude of ±2%, and a frequency of 20 Hz. The obtained results are shown in the "Rolling resistance" section of Table 1 as index values based on the value of Standard Example 1 being 100. Smaller index values indicate lower heat build-up, lower rolling resistance, and more excellent fuel economy performance.

TABLE 1

| | | Standard Example 1 | Example 1 | Example 2 | Comparative Example 1 | Comparative Example 2 | Comparative Example 3 | Comparative Example 4 | Comparative Example 5 | Example 3 | Example 4 | Comparative Example 6 | Comparative Example 7 | Example 5 | Example 6 | Comparative Example 8 | Example 7 |
|---|---|---|---|---|---|---|---|---|---|---|---|---|---|---|---|---|---|
| SBR 1 | Parts by mass | 100 (80) | 100 (80) | 100 (80) | | 100 (80) | 100 (80) | 100 (80) | 100 (80) | 100 (80) | 100 (80) | 100 (80) | 100 (80) | 100 (80) | 100 (80) | 100 (80) | 100 (80) |
| SBR 2 | Parts by mass | | | | 110 (80) | | | | | | | | | | | | |
| BR | Parts by mass | 20 | 20 | 20 | 20 | 20 | 20 | 20 | 20 | 20 | 20 | 20 | 20 | 20 | 20 | 20 | 20 |
| CB | Part by mass | 15 | 15 | 15 | 15 | 15 | 15 | 15 | 15 | 15 | 15 | 15 | 15 | 15 | 15 | 15 | 15 |
| Silica 1 | Parts by mass | 80 | 80 | 80 | 80 | 80 | 80 | 80 | 45 | 60 | 90 | 100 | 80 | 80 | 80 | 80 | |
| Silica 2 | Parts by mass | | | | | | | | | | | | | | | | 80 |
| Zinc oxide | Parts by mass | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Stearic acid | Part by mass | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Anti-aging agent 1 | Parts by mass | 3.0 | 3.0 | 3.0 | 3.0 | 3.0 | 3.0 | 3.0 | 3.0 | | | | | | | | |
| Anti-aging agent 2 | Parts by mass | 2.0 | 2.0 | 2.0 | 2.0 | 2.0 | 2.0 | 2.0 | 2.0 | | | | | | | | |
| Silane coupling agent 1 | Parts by mass respect to (mass % with silica) | 6.4 (8.0) | | | | | | | | | | | | | | | |
| Silane coupling agent 2 | Parts by mass respect to (mass % with silica) | | 6.4 (8.0) | 6.4 (8.0) | 6.4 (8.0) | 6.4 (8.0) | 6.4 (8.0) | 6.4 (8.0) | 3.6 (8.0) | | | | | | | | |
| Alkylsilane | Parts by mass | | 1.0 | 1.0 | 1.0 | 1.0 | | 1.0 | 1.0 | | | | | | | | |
| Fatty acid metal salt a | Parts by mass | | 1.0 | 1.0 | 1.0 | 1.0 | 1.0 | 1.0 | 1.0 | | | | | | | | |
| Fatty acid metal salt b | Parts by mass | | | 1.0 | | | 1.0 | 1.0 | | | | | | | | | |
| Fatty acid ester | Parts by mass | | 1.0 | 1.0 | 1.0 | | 1.0 | | 1.0 | | | | | | | | |
| Aromatic oil | Parts by mass | 10 | 10 | 10 | 0 | 10 | 10 | 10 | 10 | | | | | | | | |
| Sulfur | Part by mass | 2.0 | 2.0 | 2.0 | 2.0 | 2.0 | 2.0 | 2.0 | 2.0 | | | | | | | | |
| Vulcanization accelerator 1 | Part by mass | 2.0 | 2.0 | 1.0 | 2.0 | 2.0 | 2.0 | 2.0 | 2.0 | | | | | | | | |
| Vulcanization accelerator 2 | Part by mass | 1.0 | 1.0 | 1.0 | 1.0 | 1.0 | 1.0 | 1.0 | 1.0 | | | | | | | | |
| Workability | Index value | 100 | 90 | 88 | 85 | 95 | 97 | 93 | 83 | | | | | | | | |
| Wet Grip Properties | Index value | 100 | 103 | 105 | 95 | 98 | 94 | 99 | 99 | | | | | | | | |
| Rolling resistance | Index value | 100 | 98 | 97 | 105 | 103 | 105 | 102 | 88 | | | | | | | | |

TABLE 1-continued

| | | | | | | | | | |
|---|---|---|---|---|---|---|---|---|---|
| Anti-aging agent 1 | Parts by mass | 3.0 | 3.0 | 3.0 | 3.0 | 3.0 | 3.0 | 3.0 | 3.0 |
| Anti-aging agent 2 | Parts by mass | 2.0 | 2.0 | 2.0 | 2.0 | 2.0 | 2.0 | 2.0 | 2.0 |
| Silane coupling agent 1 | Parts by mass respect to (mass % with silica) | | | | | | | | |
| Silane coupling agent 2 | Parts by mass respect to (mass % with silica) | 4.8 (8.0) | 7.2 (8.0) | 8 (8.0) | 3 (3.8) | 4.0 (5.0) | 9.6 (12.0) | 10 (12.5) | 6.3 (7.9) |
| Alkylsilane | Parts by mass | 1.0 | 10 | 1.0 | 1.0 | 1.0 | 1.0 | 1.0 | 1.0 |
| Fatty acid metal salt a | Parts by mass | 1.0 | 1.0 | 1.0 | 1.0 | 1.0 | 1.0 | 1.0 | 1.0 |
| Fatty acid metal salt b | Parts by mass | | | | | | | | |
| Fatty acid ester | Parts by mass | 1.0 | 1.0 | 1.0 | 1.0 | 1.0 | 1.0 | 1.0 | 1.0 |
| Aromatic oil | Parts by mass | 10 | 10 | 10 | 10 | 10 | 10 | 10 | 10 |
| Sulfur | Part by mass | 2.0 | 2.0 | 2.0 | 2.0 | 2.0 | 2.0 | 2.0 | 2.0 |
| Vulcanization accelerator 1 | Part by mass | 2.0 | 2.0 | 2.0 | 2.0 | 2.0 | 2.0 | 2.0 | 2.0 |
| Vulcanization accelerator 2 | Part by mass | 1.0 | 1.0 | 1.0 | 1.0 | 1.0 | 1.0 | 1.0 | 1.0 |
| Workability | Index value | 85 | 95 | 98 | 86 | 87 | 96 | 102 | 94 |
| Wet Grip Properties | Index value | 101 | 110 | 112 | 98 | 101 | 103 | 105 | 107 |
| Rolling resistance | Index value | 90 | 99 | 101 | 103 | 99 | 97 | 95 | 98 |

The types of raw materials used as indicated in Table 1 are described below.

- SBR1: TUFDENE F3420, a solution-polymerized styrene-butadiene rubber having a glycidylamine group at a terminal, available from Asahi Kasei Corporation (styrene content: 36%; oil extended product containing 25.0 parts by mass of oil per 100 parts by mass of a rubber component)
- SBR2: NIPOL 1739, an emulsion-polymerized styrene-butadiene rubber in which the terminal ends are unmodified, available from Zeon Corporation (styrene content: 39%, oil extended product containing 37.5 parts by mass of oil per 100 parts by mass of a rubber component)
- BR: UBEPOL BR150, a butadiene rubber, available from Thai Synthetics Co., Ltd.
- CB: N-134 carbon black, available from THAI TOKAI CARBON PRODUCT CO., LTD.
- Silica 1: ULTRASIL 7000GR, available from Evonik Japan Co., Ltd. (CTAB adsorption specific surface area: 158 m²/g)
- Silica 2: ULTRASIL 9000 GR, available from Evonik Japan Co., Ltd. (CTAB adsorption specific surface area: 200 m²/g)
- Zinc oxide: Zinc Oxide III, available from Seido Chemical Industry Co., Ltd.
- Stearic acid: beaded stearic acid, available from NOF Corporation
- Anti-aging agent 1: SANTOFLEX 6PPD, available from Solutia Europe
- Anti-aging agent 2: PILNOX TDQ, available from NOCIL LIMITED
- Silane coupling agent 1: Si363, available from Evonik Degussa (sulfur-containing silane coupling agent having a mercapto group)
- Silane coupling agent 2: Si69, available from Evonik Degussa (sulfur-containing silane coupling agent not having a mercapto group)
- Alkylsilane: KBE-3083, available from Shin-Etsu Silicone Co., Ltd.
- Fatty acid metal salt a: Nonsoul SK-1, potassium stearate, available from NOF Corporation
- Fatty acid metal salt b: Zinc stearate G, a zinc stearate, available from NOF Corporation
- Fatty acid ester: Monogly D, a glyceryl stearate, available from NOF Corporation
- Aroma oil: VIVATEC 500, available from H & R Chemical
- Sulfur: Golden Flower oil treated sulfur powder (sulfur content: 95.24 mass %), available from Tsurumi Chemical Industry Co., Ltd.
- Vulcanization accelerator 1: NOCCELER CZ-G, available from Ouchi Shinko Chemical Industrial Co., Ltd.
- Vulcanization accelerator 2: Soxinol D-G, available from Sumitomo Chemical Co., Ltd.

As is clear from Table 1, with the rubber compositions of Examples 1 to 7, processability, wet grip properties, and rolling resistance were improved in a well-balanced manner with respect to Standard Example 1.

On the other hand, with the rubber composition of Comparative Example 1, wet grip properties and rolling resistance worsened because the rubber composition of Comparative Example 1 did not contain a terminal-modified diene rubber. The rubber composition of Comparative Example 2 did not contain a fatty acid ester, and thus wet grip properties and rolling resistance worsened. The rubber composition of Comparative Example 3 did not contain an alkylsilane, and thus wet grip properties and rolling resistance worsened. While the rubber composition of Comparative Example 4 contained two types of fatty acid metal salts (a fatty acid metal salt a and a fatty acid metal salt b), it did not contain a fatty acid ester, and thus the wet grip properties and rolling resistance worsened. The compounded amount of silica in the rubber composition of Comparative Example 5 was too low, and thus wet grip properties worsened. The compounded amount of silica in the rubber composition of Comparative Example 5 was too high, and thus the rolling resistance worsened. The compounded amount of the silane coupling agent in the rubber composition of Comparative Example 7 was too low with respect to the silica, and thus the wet grip properties and rolling resistance worsened. The compounded amount of the silane coupling agent in the rubber composition of Comparative Example 8 was too high with respect to the silica, and thus processability worsened.

Figure 4:
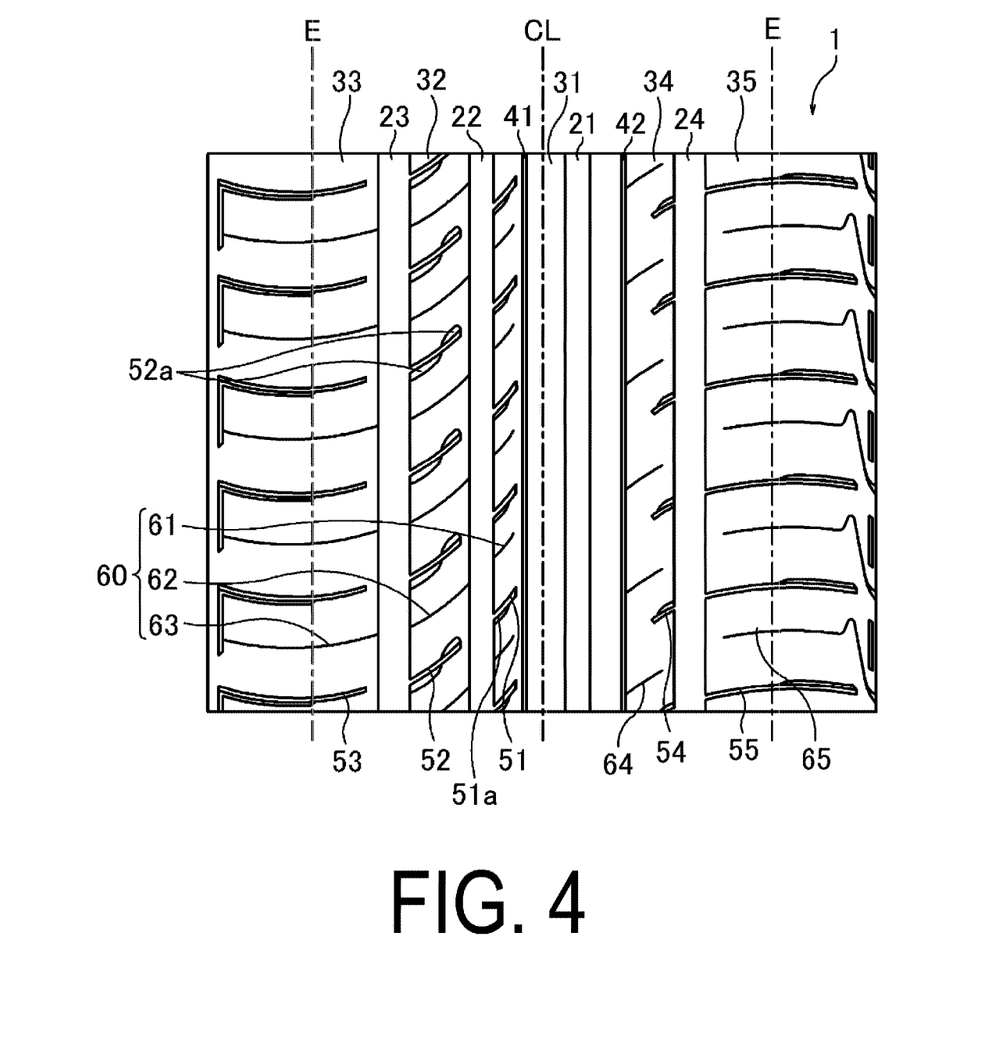
FIG. 4 is a front view illustrating a tread portion of a pneumatic tire according to another embodiment of the present invention.

Additionally, pneumatic tires having the tread patterns illustrated in FIG. 1 or FIG. 4 were produced using the rubber compositions of Examples 1 to 7 in the tread portion, and the wet performance (sensory evaluation by a test driver of running performance on wet road surfaces) was evaluated. In each case, the pneumatic tire having the tread pattern of FIG. 1 exhibited excellent wet performance. Note that the tread pattern of FIG. 4 has a structure in which, with respect to the tread pattern illustrated in FIG. 1, the end portion on the tire equator side of each lug groove (center lug groove, intermediate lug groove, and shoulder lug groove) is terminated within the land portion without communicating with a main groove or the circumferential narrow groove (i.e., a structure in which the communication lug grooves are not formed).

The invention claimed is:

1. A pneumatic tire comprising:
   a tread portion composed of a tread rubber composition, the tread portion extending in a tire circumferential direction and having an annular shape; the tread rubber composition comprising:
   a diene rubber component comprising 30 mass % to 90 mass % of a terminal-modified diene rubber;
   50 parts by mass to 90 parts by mass of silica, per 100 parts by mass of the diene rubber component;
   0.5 mass % to 10 mass %, relative to the mass of the silica, of an alkylsilane;
   1.25 mass % to 4 mass %, relative to the mass of the silica, of a potassium fatty acid salt a;
   0.5 mass % to 4 mass %, relative to the mass of the silica, of a fatty acid metal salt b different from the potassium fatty acid salt a;
   0.3 mass % to 6 mass %, relative to the mass of the silica, of a fatty acid ester; and
   5 mass % to 12 mass %, relative to the mass of the silica, of a sulfur-containing silane coupling agent not containing a mercapto group,
   the terminal-modified diene rubber being a styrene-butadiene rubber in which at least one terminal of a main chain of the styrene-butadiene rubber is modified by a functional group that is reactive with a silanol group on a surface of the silica, and
   a styrene unit content of the styrene-butadiene rubber being 35 mass % or more.

2. The pneumatic tire according to claim 1, wherein a CTAB adsorption specific surface area of the silica is 180 $m^2/g$ to 250 $m^2/g$.

3. The pneumatic tire according to claim 2, wherein at least three main grooves extending in the tire circumferential direction and disposed at intervals outward in a tire lateral direction from a tire center region are disposed in the tread portion, and the tread portion comprises a center land portion defined by the main grooves and located on a tire equator, a shoulder land portion disposed on an outermost side in the tire lateral direction, and an intermediate land portion disposed between the center land portion and the shoulder land portion and defined by the main grooves, the center land portion comprising a circumferential narrow groove extending in the tire circumferential direction and having a groove width that is smaller than that of the main grooves and a center lug groove extending in the tire lateral direction with a first end portion on a side of the intermediate land portion communicating with the main groove and with a second end portion communicating with the circumferential narrow groove, the intermediate land portion comprising an intermediate lug groove extending in the tire lateral direction with both ends communicating with the main grooves, the shoulder land portion comprising a shoulder lug groove extending in the tire lateral direction with a first end portion on the intermediate land portion side communicating with the main groove and with a second end portion opening to a ground contact edge, and the center lug groove, the intermediate lug groove, and the shoulder lug groove form a series of communication lug grooves extending continuously from the ground contact edge toward a side of the tire equator.

4. The pneumatic tire according to claim 1, wherein at least three main grooves extending in the tire circumferential direction and disposed at intervals outward in a tire lateral direction from a tire center region are disposed in the tread portion, and the tread portion comprises a center land portion defined by the main grooves and located on a tire equator, a shoulder land portion disposed on an outermost side in the tire lateral direction, and an intermediate land portion disposed between the center land portion and the shoulder land portion and defined by the main grooves, the center land portion comprising a circumferential narrow groove extending in the tire circumferential direction and having a groove width that is smaller than that of the main grooves and a center lug groove extending in the tire lateral direction with a first end portion on a side of the intermediate land portion communicating with the main groove and with a second end portion communicating with the circumferential narrow groove, the intermediate land portion comprising an intermediate lug groove extending in the tire lateral direction with both ends communicating with the main grooves, the shoulder land portion comprising a shoulder lug groove extending in the tire lateral direction with a first end portion on the intermediate land portion side communicating with the main groove and with a second end portion opening to a ground contact edge, and the center lug groove, the intermediate lug groove, and the shoulder lug groove form a series of communication lug grooves extending continuously from the ground contact edge toward a side of the tire equator.

5. The pneumatic tire according to claim 1, wherein
   the functional group is at least one selected from the group consisting of: a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group.

6. The pneumatic tire according to claim 1, wherein the tread rubber composition includes 60 parts by mass to 80 parts by mass of the silica.

7. A pneumatic tire comprising:
a tread portion composed of a tread rubber composition, the tread portion extending in a tire circumferential direction and having an annular shape; the tread rubber composition comprising:
a diene rubber component comprising 30 mass % to 90 mass % of a terminal-modified diene rubber;
50 parts by mass to 90 parts by mass of silica, per 100 parts by mass of the diene rubber component;
0.5 mass % to 10 mass %, relative to the mass of the silica, of an alkylsilane;
0.5 mass % to 4 mass %, relative to the mass of the silica, of a potassium fatty acid salt a;
0.5 mass % to 4 mass %, relative to the mass of the silica, of a zinc fatty acid salt b;
0.3 mass % to 6 mass %, relative to the mass of the silica, of a fatty acid ester; and
5 mass % to 12 mass %, relative to the mass of the silica, of a sulfur-containing silane coupling agent not containing a mercapto group,
the terminal-modified diene rubber being a styrene-butadiene rubber in which at least one terminal of a main chain of the styrene-butadiene rubber is modified by a functional group that is reactive with a silanol group on a surface of the silica, and
a styrene unit content of the styrene-butadiene rubber being 35 mass % or more.

* * * * *